United States Patent
Lin (10) Patent No.: US 10,841,898 B2
(45) Date of Patent: Nov. 17, 2020

(54) METHOD OF RECEIVING PAGING MESSAGES FOR UE AND UE USING THE SAME

(71) Applicant: Acer Incorporated, New Taipei (TW)

(72) Inventor: Jung-Mao Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/387,555

(22) Filed: Apr. 18, 2019

(65) Prior Publication Data

US 2020/0029298 A1 Jan. 23, 2020

Related U.S. Application Data

(60) Provisional application No. 62/699,780, filed on Jul. 18, 2018.

(51) Int. Cl.
| | | |
|---|---|---|
| *H04W 68/00* | (2009.01) | |
| *H04W 36/08* | (2009.01) | |
| *H04W 76/11* | (2018.01) | |
| *H04W 76/27* | (2018.01) | |
| *H04W 76/28* | (2018.01) | |
| *H04W 76/50* | (2018.01) | |

(52) U.S. Cl.
CPC ......... *H04W 68/005* (2013.01); *H04W 36/08* (2013.01); *H04W 76/11* (2018.02); *H04W 76/27* (2018.02); *H04W 76/28* (2018.02); *H04W 76/50* (2018.02)

(58) Field of Classification Search
CPC ..... H04W 76/27; H04W 76/28; H04W 76/11; H04W 68/005; H04W 68/02; H04W 76/50; H04W 36/08
See application file for complete search history.

(56) References Cited

U.S. PATENT DOCUMENTS

| | | | |
|---|---|---|---|
| 2014/0162705 A1* | 6/2014 | De Wit | H04W 4/16 |
| | | | 455/458 |
| 2017/0181121 A1* | 6/2017 | Kollar | H04W 68/02 |
| 2018/0110027 A1* | 4/2018 | Mochizuki | H04W 4/70 |

(Continued)

FOREIGN PATENT DOCUMENTS

| | | |
|---|---|---|
| EP | 3499990 | 6/2019 |
| WO | 2008022782 | 2/2008 |
| WO | 2018028432 | 2/2018 |

OTHER PUBLICATIONS

Mediatek Inc., "Remaining Details on Bandwidth Part Operation in NR." 3GPP TSG RAN WG1 Meeting 90bis, Oct. 9-13, 2017, pp. 1-13.

(Continued)

*Primary Examiner* — Brian D Nguyen (74) *Attorney, Agent, or Firm* — JCIPRNET (57) ABSTRACT

The disclosure provides a method and an apparatus for receiving a paging message in an environment of a 5G communication system. In an aspect, the disclosure is directed to a method of receiving a paging message for a UE compatible with a 5G communication system. The method would include not limited to: receiving a paging record (PR) delivery rule; entering into a power saving mode; determining a bandwidth part (BWP) according to the PR delivery rule; re-selecting to a cell which corresponds to the BWP which has been determined; and receiving a paging message transmitted through the BWP by the cell.

20 Claims, 9 Drawing Sheets

(56) References Cited

U.S. PATENT DOCUMENTS

2019/0223153 A1* 7/2019 Kim .................. H04W 48/08
2019/0387496 A1* 12/2019 Liu .................. H04W 68/02
2020/0077338 A1* 3/2020 Sui ................... H04W 52/0229
2020/0092845 A1* 3/2020 Cai ................... H04W 68/02
2020/0092846 A1* 3/2020 Deng ................ H04B 7/0695

OTHER PUBLICATIONS

Intel Corporation, "Bandwith parts configuration and operations." 3GPP TSG RAN WG1 Meeting #89, May 15-19, 2017, pp. 1-5.

Zte, et al., "Clarification on the Cell ID for wideband carrier with multiple SSBs." 3GPP TSG-RAN WG2 Meeting #101bis, Apr. 16-20, 2018, pp. 1-4.

"Search Report of Europe Counterpart Application", dated Nov. 15, 2019, p. 1-p. 11.

Media Tek Inc.,"Paging Record Size in NR", 3GPP TSG-RAN WG2 Meeting #101bis, Apr. 16-20, 2018, pp. 1-2.

QUALCOMM Incorporated, "Report of Email Discussion [NR-A1-11801#14][NR] RRC inactive procedures", 3GPP TSG-RAN WG2 Meeting #101, Feb. 26-Mar. 2, 2018, pp. 1-16.

Ericsson, "[E136] Securing sufficient paging capacity with 16 paging records", 3GPP TSG-RAN WG2 AH 1807 Tdoc R2-1809619, Jul. 2-6, 2018, pp. 1-4.

3GPP, "3rd Generation Partnership Project; Technical Specification Group Radio Access Network; NR; NR and NG-RAN Overall Description; Stage 2 (Release 15)", 3GPP TS 38.300 V15.2.0, Jun. 2018, pp. 1-87.

* cited by examiner

FIG. 10

METHOD OF RECEIVING PAGING MESSAGES FOR UE AND UE USING THE SAME

CROSS REFERENCE TO RELATED APPLICATION

This application claims the priority benefit of U.S. provisional application Ser. No. 62/699,780, filed on Jul. 18, 2018. The entirety of the above-mentioned patent application is hereby incorporated by reference herein and made a part of specification.

TECHNICAL FIELD

The present disclosure is directed to a method of receiving a paging message for a user equipment (UE) and a UE using the same method.

BACKGROUND

Currently, one possible paging message implementation would involve using a Synchronization Signal Block (SSB) to associate with a remaining minimum system information (RMSI), and such SSB which is associated with a RMSI is a CD-SSB. The CD-SSB would be received by a UE to inform the UE the physical resource from which the RMSI could be received as different UEs which receive different CD-SSBs could receive the RMSI in the different physical resource. Based on the received RMSI, a UE may know the physical resource from which paging messages (PMs) could be received.

Each CD-SSB may carry a bandwidth part (BWP) configuration. After a UE wakes up from an idle mode or an inactive mode, the UE could be configured with a BWP which is configured by the CD-SSB selected by the UE in an idle mode or an inactive mode as its initial BWP after the UE sets up a connection.

Figure 1:
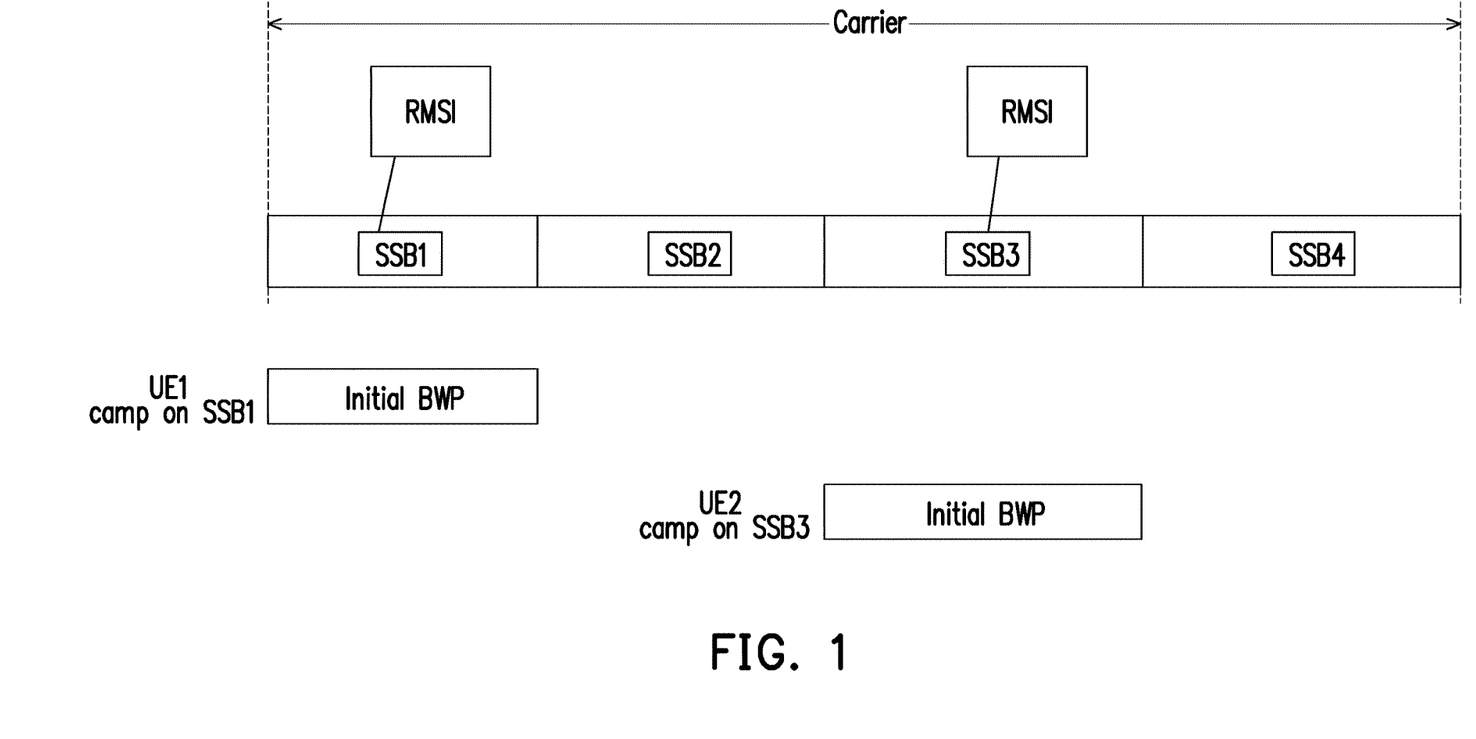
FIG. 1 illustrates an example of a current paging message implementation which involves using a wideband carrier to transmit a plurality of SSBs.

FIG. 1 illustrates an example of the above described paging message implementation. A base station such as a gNB may transmit a plurality of SSBs located within a wideband aggregated carrier which is divided into a plurality of BWPs as each BWP may contain a different SSB, and some of the SSBs are associated with the RMSI. As shown in FIG. 1, UE 1 could be camped on SSB1 and be configured with a first BWP, and UE 2 could be camped on SSB3 and be configured with a second BWP. As multiple CD-SSBs are transmitted within the wideband carrier, such deployment with the multiple CD-SSBs could help the gNB to distribute the UEs in an idle mode or in an inactive mode and may reduce power consumptions of UEs by balancing the loadings when such UEs enter the connected mode from the idle mode or the inactive mode. Also, the multiple CD-SSBs deployment could help the gNB to increase UE capacity and would likely to reduce the overall power consumptions of the UEs in general.

However, as different UEs may select different CD-SSBs to camp on, a gNB does not actually know the distribution of the camping UEs within multiple CD-SSBs. Therefore, during a process of paging, in order for the gNB to not miss any UEs, the gNB will need to deliver the same paging messages (PMs) at each initial BWP. The PM may need to include all paging records (PRs) from a 5G core network (5GC). The loadings involved in these paging message may increase based on the number of CD-SSBs within the wideband carrier.

Figure 2:
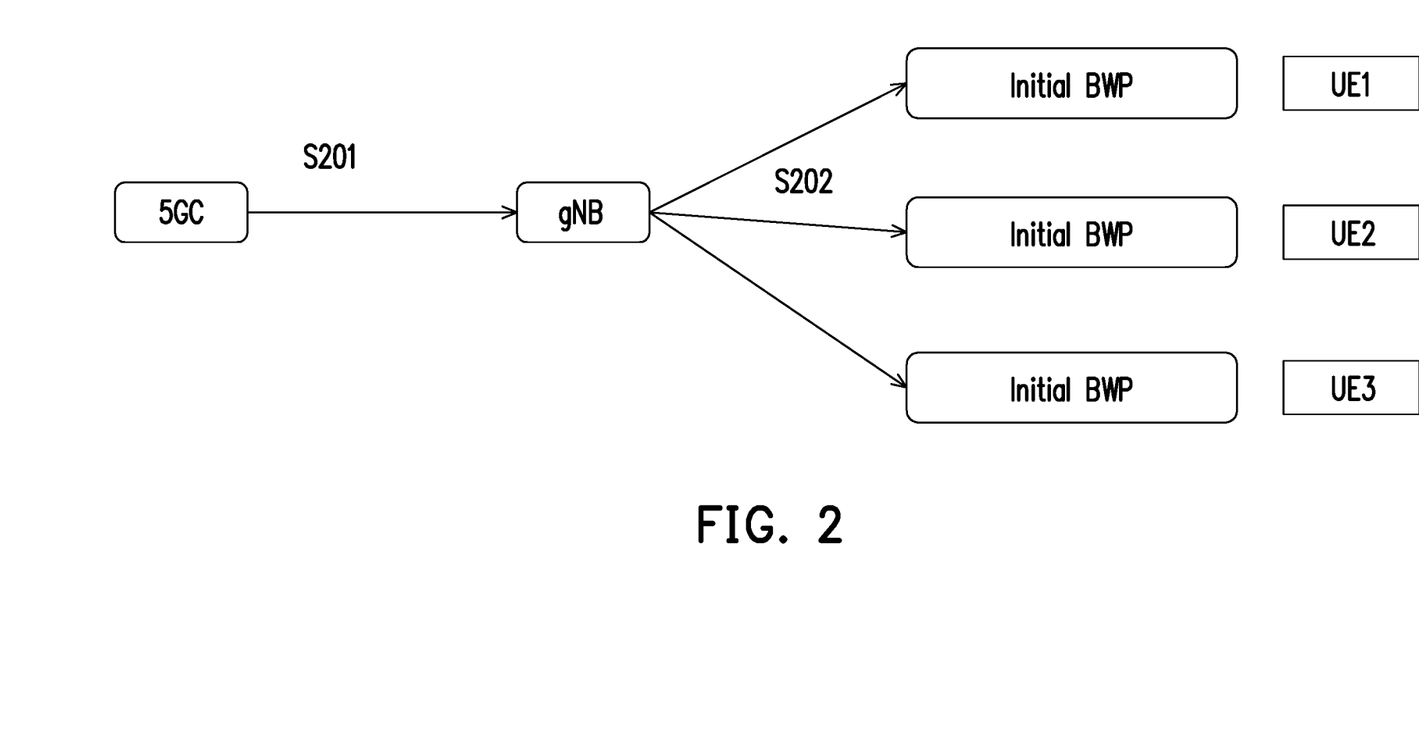
FIG. 2 illustrates an example of a current paging message implementation which involves transmitting identical paging records in one or more paging messages to each of the BWPs.

FIG. 2 illustrates an example of a current mechanism to transmit paging records to UEs distributed across different initial BWPs. As shown in FIG. 2, assuming that a 5G core network needs to transmit 20 PRs to a gNB as each PR is associated with a DRX cycle and is tied to a different UE identity (ID), the gNB would then need to transmit PMs having the same 20 PRs to each of the UEs camped in all of the initial BWPs in order to not miss any UE. Such implementation would result in inefficient use of bandwidth, power consumption, and paging messages. Therefore, a more efficient mechanism is required in order to increase network efficiency.

SUMMARY OF THE DISCLOSURE

Accordingly, to address the above described difficulty, the disclosure provides a method of receiving a paging message for a UE compatible with a 5G communication system and a UE using the same method.

In an aspect, the disclosure is directed to a method of receiving a paging message for a UE compatible with a 5G communication system, and the method would include not limited to: receiving a paging record (PR) delivery rule; determining a bandwidth part (BWP) according to the PR delivery rule; or re-selecting a cell which corresponds to the BWP which has been determined.

In another aspect, the disclosure is directed to a 5G UE, and the UE would include not limited to: a processor coupled to the wireless receiver and configured to: receive, via the wireless receiver, a PR delivery rule; enter into a power saving mode; determine a BWP according to the PR delivery rule; re-select a cell which corresponds to the BWP which has been determined; and receive, via the wireless receiver, a paging message transmitted through the BWP by the cell.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the present exemplary embodiments of the disclosure, examples of which are illustrated in the accompanying drawings. Wherever possible, the same reference numbers are used in the drawings and the description to refer to the same or like parts.

Figure 3:
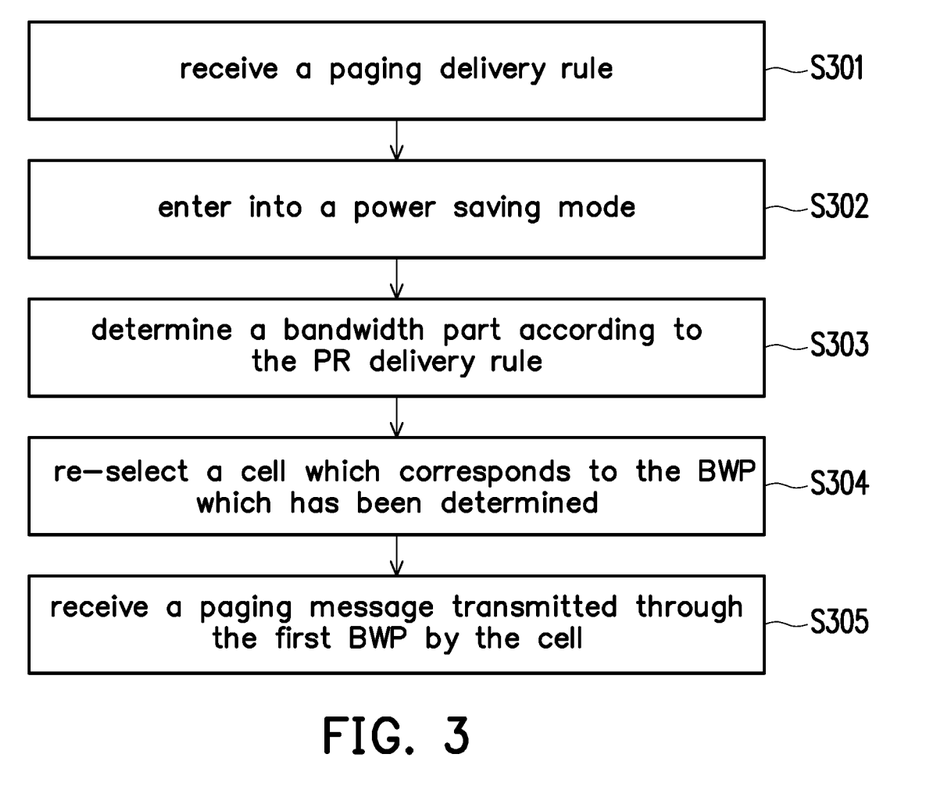
FIG. 3 is a flow chart which illustrates a method of receiving a paging message for a UE which is compatible with a 5G communication system according to one of the exemplary embodiments of the disclosure.

Accordingly, to address the above described difficulty, the disclosure provides a method of receiving a paging message for a UE compatible with a 5G communication system and a UE using the same method. FIG. 3 is a flow chart which illustrates a method of receiving a paging message for a UE which is compatible with a 5G communication system according to one of the exemplary embodiments of the disclosure. Referring to FIG. 3, in step S301, the UE is assumed to have received from a gNB one PR delivery rule or a set of PR delivery rules as each PR delivery rule could be directed to a different BWP group. In step S302, the UE may enter into a power saving mode. The power saving mode is used for a UE reducing power consumption. For example, the power saving mode could be idle mode or inactive mode. It is worth noting that a PR delivery rule could be received by the UE in different ways. For instance, a UE may receive system information transmitted from a gNB or other nearby base station. Such system information may contain a PR delivery rule. Further, the PR delivery rule could be transmitted in a radio resource control (RRC) signaling message such as an RRC release message. When a UE is at a power saving mode such as an idle mode, an inactive mode, or a sleep mode, then UE may receive a PR delivery rule from the system information message.

In step S303, the UE would determine a bandwidth part according to the PR delivery rule. In particular, the UE would determine, based on its own available information such as the UE ID, the DRX cycle, or other information of the PR delivery rule, which BWP to transmit one's own PR. If the UE is not located under the cell which corresponds to the BWP to transmit one's own PR, then the UE has to re-select the proper cell. In step S304, the UE would consider a cell as the highest priority to camp on which corresponds to the BWP that has been determined, and the UE would listen to paging messages from the BWP. In step S305, the UE may receive a paging message which has been transmitted through the determined BWP by the cell.

The previously described paging message may include a first plurality of paging records as each of the first plurality of paging records corresponds to a discontinuous reception (DRX) cycle and an identification (ID) of a UE. The first plurality of paging records of the paging message may have a different quantity from a second plurality of paging records of another paging message which is transmitted through another BWP.

The previously described PR delivery rule may include a PR delivery information and a BWP information such that the UE may determine a frequency location of the BWP based on the PR delivery information and the BWP information. Specifically, the UE may check whether one of various PR delivery information is satisfied. The PR delivery information may include UE IDs, DRX cycles, paging record categories, and etc. Each of the PR delivery information is associated to at least a specific BWP. If one of the PR delivery information is satisfied, the UE will select to the corresponding BWP to receive corresponding paging messages. The UE may also determine the frequency location of the BWP based on the BWP information based on a frequency information of the BWP associated with a CD-SSB, a frequency information of the paging message, or an assisting information of the frequency location of the BWP. The paging categories could be, for instance, various levels of urgencies of the UE. The assisting information could be, for instance, a frequency offset of the BWP. In one of the exemplary embodiments, the PR delivery rule may further include another PR delivery rule of a neighboring base station.

Figure 4:
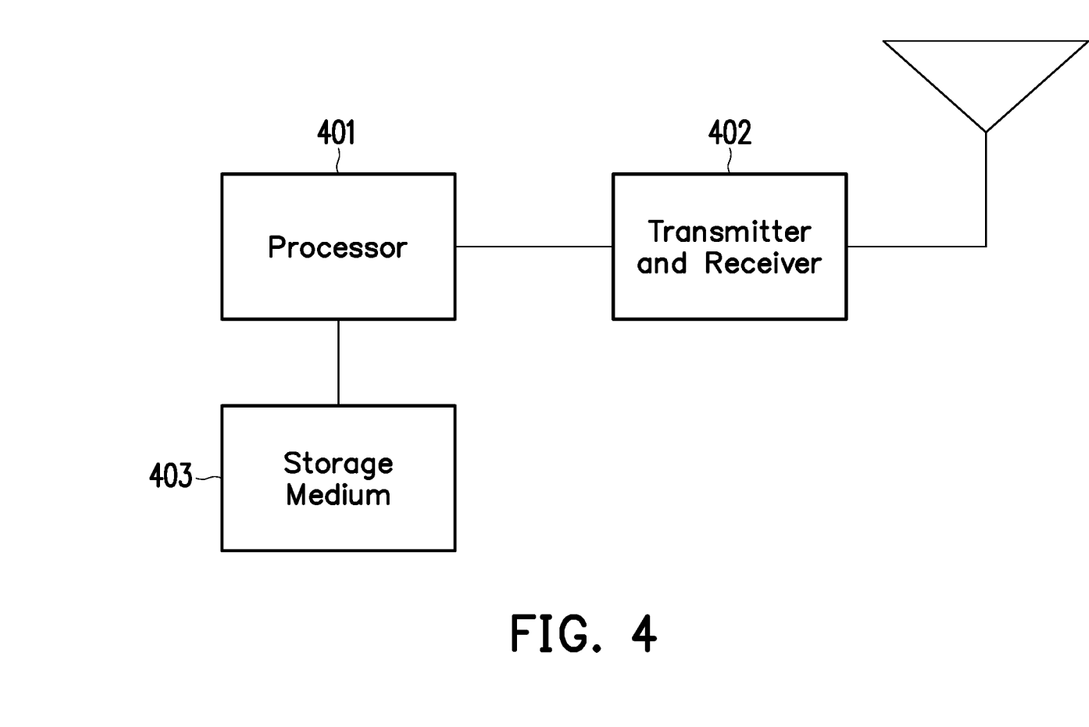
FIG. 4 illustrates an exemplary UE according to one of the exemplary embodiments of the disclosure.

FIG. 4 illustrates an exemplary UE according to one of the exemplary embodiments of the disclosure. The hardware of the UE would include not limited to a hardware processor 401, a hardware transceiver 402 which may include integrated or separate transmitter and receiver, and non-transitory storage medium 403. The hardware processor 401 is electrically connected to the hardware transceiver 402 and the non-transitory storage medium 403 and configured at least for implementing the method of receiving a paging message for a UE which is compatible with a 5G communication system as well as its exemplary embodiments and alternative variations.

The hardware transceiver 402 may include one or more transmitters and receivers configured to transmit and receive signals respectively in the radio frequency or in the mmWave frequency. The hardware transceiver 402 may also perform operations such as low noise amplifying, impedance matching, frequency mixing, up or down frequency conversion, filtering, amplifying, and so forth. The hardware transceiver 1102 may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceiver 402 may further include an antenna array which may include one or multiple antennas to transmit and receive omni-directional antenna beams or directional antenna beams.

The hardware processor 401 is configured to process digital signals and to perform procedures of the proposed hierarchical registration method in accordance with the proposed exemplary embodiments of the disclosure. Also, the hardware processor 401 may access to the non-transitory storage medium 403 which stores programming codes, codebook configurations, buffered data, and record configurations assigned by the hardware processor 401. The hardware processor 401 could be implemented by using programmable units such as a micro-processor, a microcontroller, a DSP chips, FPGA, etc. The functions of the hardware processor 401 may also be implemented with separate electronic devices or ICs. It should be noted that the functions of hardware processor 401 may be implemented with either hardware or software.

As previously described, conventionally since a base station does not know the whereabouts of UEs and does not want to miss a paging message to a UE, a base station would transmit the same PRs within PMs to all initial BWPs. However, such implementation is inefficient since each PR is unique to a UE, and a UE would only be located at a cell at a moment in time, and thus a UE would only receive from one initial BWP at once. One of the main concepts of the disclosure is to configure a gNB to transmit different PRs within PMs at different initial BWPs. Under such implementation, different PRs transmitted to different BWPs may imply that the PMs are not identical but could be different as the PMs are delivered to each BWP.

Figure 5:
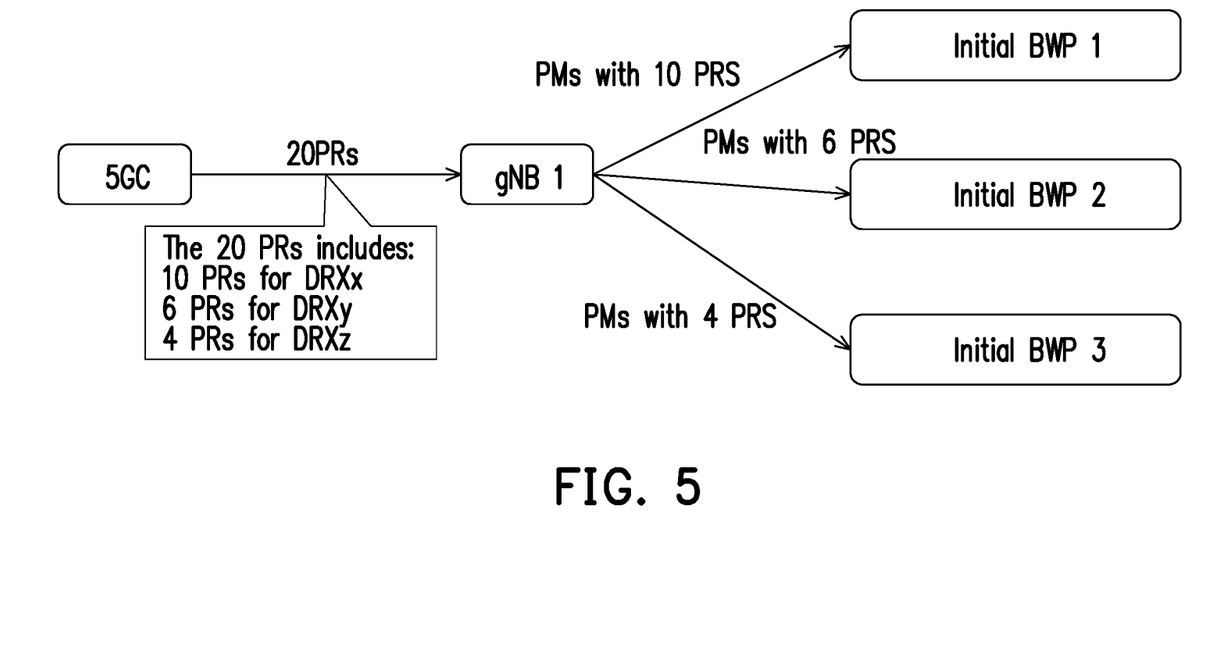
FIG. 5 illustrates a mechanism of transmitting different PRs within PMs at different initial BWP according to one of the exemplary embodiments of the disclosure.

FIG. 5 illustrates a mechanism of transmitting different PRs within PMs at different initial BWP according to one of the exemplary embodiments of the disclosure. In the example of FIG. 5, it is assumed that the 5GC transmit 20 PRs to find 20 different UEs as each PR correspond to a different unique ID. Moreover, the 20 PRs may be configured with different DRX cycles. For example, 10 PRs out of the 20 PRs might be associated with DRX cycle value x, 6 PRs out of the 20 PRs might be associated with DRX cycle value y, and 4 PRs out of the 20 PRs might be associated with DRX cycle value z. After the gNB receives from the 5GC the 20 PRs, the gNB would categorize the PRs according to their DRX cycles and distribute the PRs based on current BWP situation. For example, the PRs that is associated with DRX cycle value x may be to be transmitted at BWP1, the PRs that is associated with DRX cycle value y may be transmitted at BWP2, and the PRs that is associated with DRX cycle value z may be transmitted at BWP3. In this way, as long as both a gNB and the UE know the DRX cycle of the UE, a gNB would be able to transmit a PR to a UE at a specific BWP without resorting to transmit all PRs to initial BWPs in order to page a UE.

Figure 6:
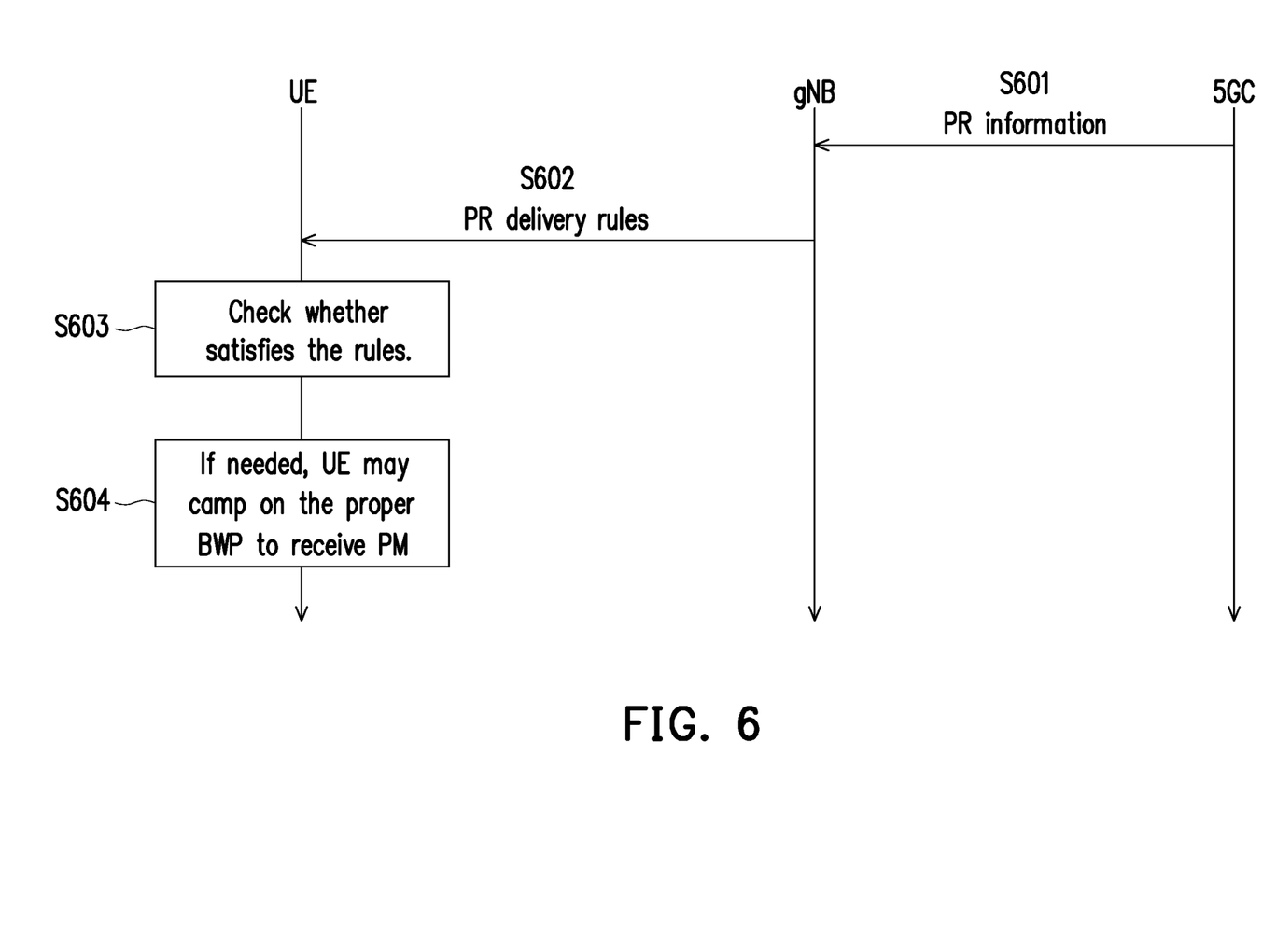
FIG. 6 is a signaling diagram serves to illustrates signaling exchanges among 5GC, gNB, and UE according to one of the exemplary embodiments of the disclosure.

FIG. 6 is a signaling diagram serves to illustrate signaling exchanges among 5GC, gNB, and UE according to one of the exemplary embodiments of the disclosure. In step S601, a 5GC would transmit to a gNB a PR information which may include PRs for a number of UEs. Moreover, the 5GC may provide additional PR information for each of the PRs, and thus each PR information may include additional information to be used during implementation of the paging mechanism such as category or class associated with each PR, the device capability associated with each PR, the service type associated with each PR, or the calling type of each PR. The category or class associated with each PR may include information such as urgency of the PR, subscription level, or others. In step S602, in response to receiving the PR information, the gNB would transmit PR delivery rules to one or more UEs which are within the coverage of the gNB. In step S603, in response to receiving a PR delivery rule. Based on the PR delivery rule, the UE would camp on a proper BWP from which the UE may receive its paging message. The content of the PR delivery rule is to be explained in further detail.

A PR delivery rule may include at least a PR delivery information and a BWP information. The PR delivery information may at least include the information of how the PRs be classified. The PRs could be classified based on the DRX cycle of each PR, the UE ID of each PR, or the additional PR information which has been described previously as the category of each PR, the capability of each PR, the service type of each PR, or the calling type of each PR. The additional PR information could be provided by a 5GC along with information of PRs.

Figure 7:
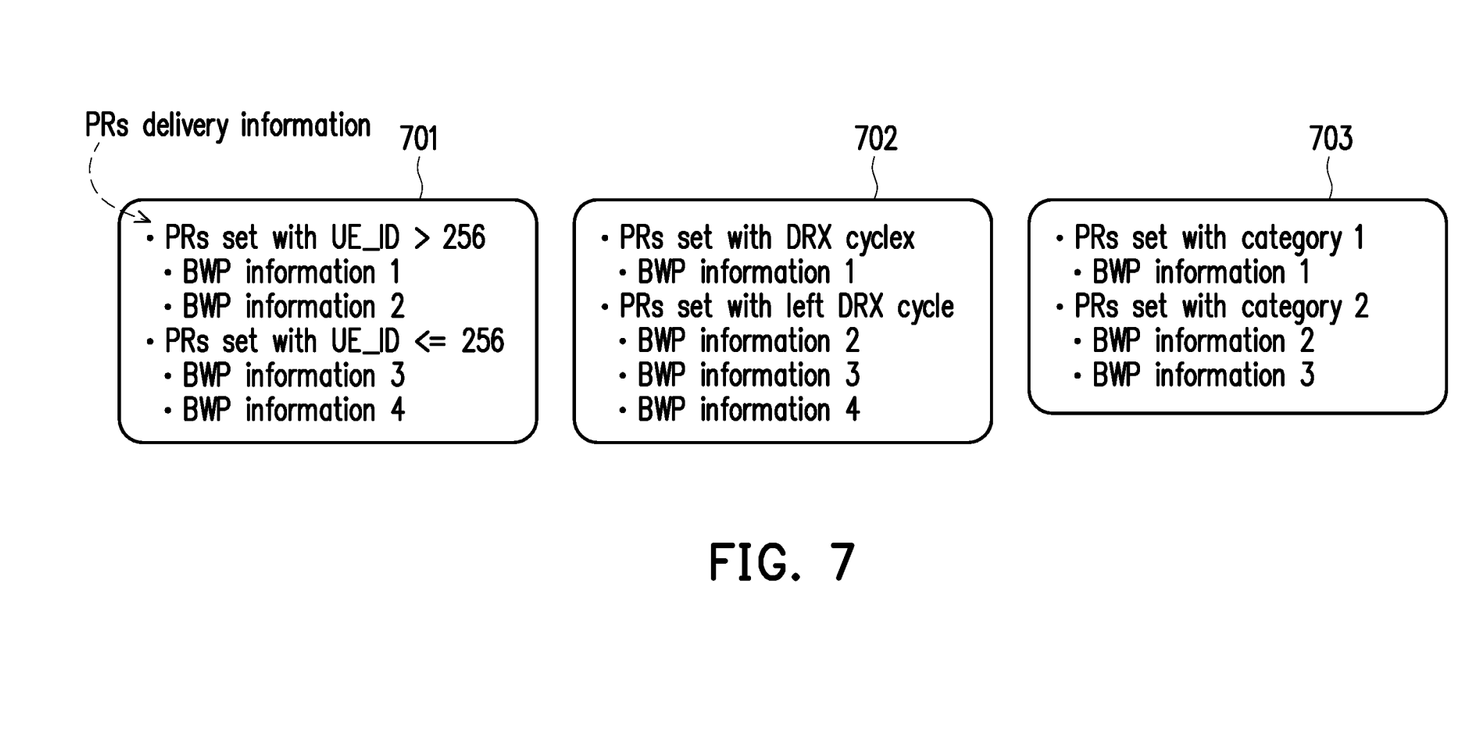
FIG. 7 illustrates an example of contents of PR delivery information according to one of the exemplary embodiments of the disclosure.

FIG. 7 illustrates an example of contents of PR delivery information according to one of the exemplary embodiments of the disclosure. In the example of FIG. 7, a group of PRs could be classified under one of three ways which include the ID 701 of each UE, the DRX cycle 702 of each UE, or the category 703 of each PR. Different groups of PRs may adopt different ways of classifying the PRs. For instance, PRs that are classified by an ID 701 of the UE could be that if IDs of the UEs are greater than 256, then those corresponding PRs would be delivered on the first BWP and/or the second BWP (e.g. BWP information 1 and BWP information 2). If the IDs of the UEs are less then or equal to 256, then those corresponding PRs would be delivered on the third BWP and/or the fourth BWP (e.g. BWP information 3 and BWP information 4). For instance, PRs that are classified by a DRX cycle 702 of the UE could be that if the DRX cycle of the UEs are x, then those corresponding PRs would be delivered on the first BWP. If the DRX cycle 702 of the UE is not x, then those corresponding PRs would be delivered on the second BWP and/or third BWP and/or the fourth BWP. For instance, PRs that are classified by a category 703 of the UE could be that if category of the UEs is category 1, then those corresponding PRs would be delivered on the first BWP. If the category of the UEs is category 2, then those corresponding PRs would be delivered on the second BWP and/or the third BWP.

Under the circumstance when multiple PRs are satisfied, the UE may obtain multiple paging messages from multiple BWPs or the UE may select one paging message from one BWP. Otherwise, some PRs may have higher priority over other PRs, the UE may select a paging message which contain a PR having a higher priority.

In addition to the PR delivery information, the PR delivery rule would also include BWP information. The BWP information is used by a UE find to the BWP from which a paging message is to be received. The BWP information may be frequency information of the BWP which is associated with a CD-SSB, assisting information of the frequency location of the BWP which associated the CD-SSB or the frequency information of paging message. The above described assisting information could be a frequency offset of a current BWP.

In one of exemplary embodiments, a gNB would be able to configure multiple PR delivery rules for different BWP groups, as each PR delivery rule is applicable for one BWP group. The gNB may decide which BWPs could be grouped based on a signal feature of the BWPs and then apply the same PR delivery rule for each group. For example, the gNB may only consider the BWPs with similar signal feature as a group and apply the same PR delivery rule. gNB may provide a default PR delivery BWP in PR the delivery rule. The default PR delivery BWP is a BWP that provides all PRs. An example of such implementation is provided in FIG. 8.

Figure 8:
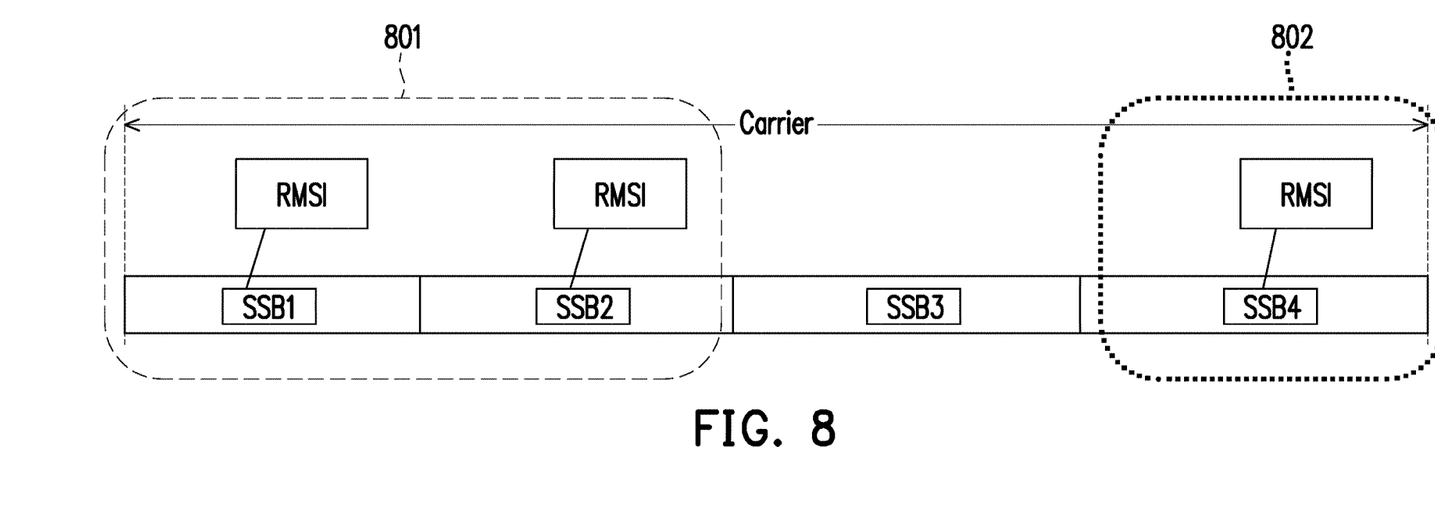
FIG. 8 illustrates an example of a gNB configuring multiple PRs delivery rules for different BWP groups according to one of the exemplary embodiments of the disclosure.

FIG. 8 illustrates an example of a gNB configuring multiple PRs delivery rules for different BWP groups according to one of the exemplary embodiments of the disclosure. For example, If SSB1 and SSB2 have similar signal feature, they could be grouped as a first BWP group 801 which would apply the same the PR delivery rule. If the signal feature of SSB4 is different from the signal feature of SSB1 and SSB2, then SSB4 could be the only member of a second BWP group 802 which would apply a different PR delivery rule from the first BWP group 801. For the first BWP group 801, the PR delivery rule could be, for example, PRs associated with IDs being greater than 256, then the PRs are to be transmitted on the first BWP (e.g. BWP information 1). The PRs associated with IDs that are less than or equal to 256 are to be transmitted on the second BWP (e.g. BWP information 2). Once a BWP has delivered all the PRs, then it may not need any more PR delivery rule.

Figure 9:
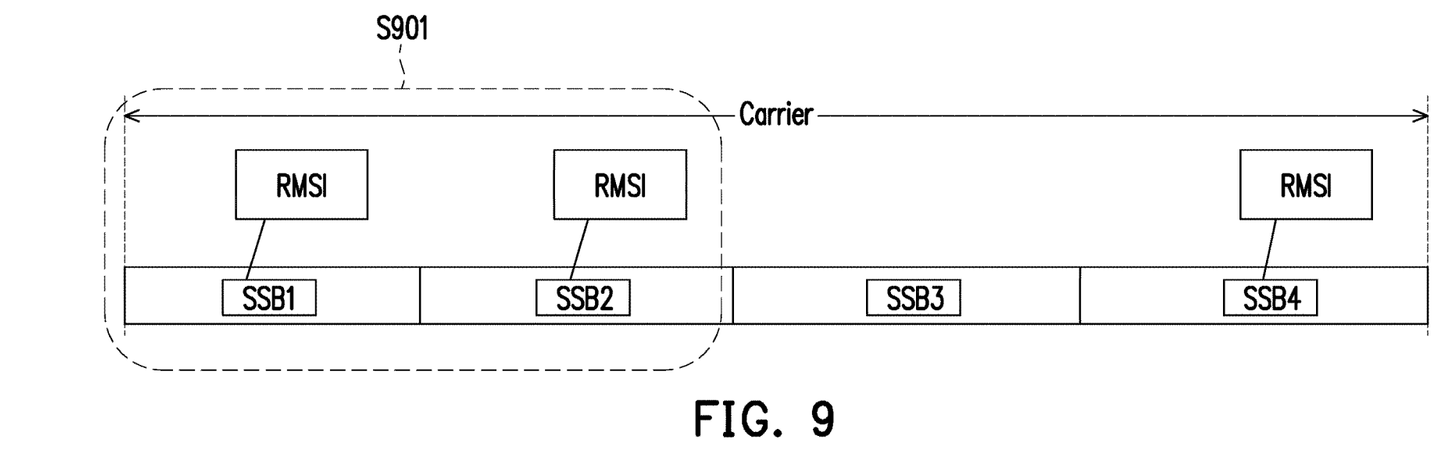
FIG. 9 illustrates an example of a gNB configuring PRs delivery rules based on the BWP loading or feature of PRs according to one of the exemplary embodiments of the disclosure.

FIG. 9 illustrates an example of a gNB configuring PRs delivery rules based on the BWP loading or feature of PRs according to one of the exemplary embodiments of the disclosure. The gNB may decide which PRs delivery rule to be implemented based on the BWP loadings or the feature of PRs. For example, once a BWP experiences heavy loading, the PR delivery rule could be selected so that the number of PRs to be delivered at the BWP would be small or the interval of PRs to be delivered at the BWP would be long. For another example, if a BWP has experienced heavy loading, the BWP could be configured to deliver the PRs with a long DRX cycle or with a small range of IDs of UEs. Alternatively, some low priority PRs could be delivered at fewer BWPs once heavy loading in some BWP has been detected.

Referring to the example of FIG. 9, it is supposed that the PR delivery rule has been set up such that the PRs associated with IDs that are greater than the number 256 would be transmitted in the first BWP (e.g. BWP information 1), and the PRs associated with IDs that are less than or equal to the number 256 would be transmitted in the second BWP (e.g. BWP information 2). It is supposed that the BWP which is associated with SSB2 has experience heavy loading relative to the traffic in SSB1, then the BWP associated with SSB2 may deliver less PRs. This means that the range of the IDs of the UEs might be adjusted so that the PRs to be transmitted in the second BWP would be associated with IDs that are a lot less than 256 in order to reduce the quantity of PRs to be transmitted over the second BWP. It would mean that the PRs to be transmitted in the first BWP would increase so that the PRs to be transmitted in the first BWP would be associated with IDs that are far less than 256 which is the same as the UE IDs transmitted by the adjusted second BWP in order to increase the number of UEs transmitted in the first BWP so that there will be no missing UEs. Alternatively, the second BWP could be used to transmit PRs with longer DRX cycles, and the first BWP could be used to transmit PRs with shorter DRX cycles.

From the perspective of the UE, the PR delivery information would be required by the UE in order to for the UE to properly receive paging messages. For example, it is supposed that the PRs are classified by the IDs of the UEs such that the PRs associated with IDs over 256 would be transmitted in the first BWP (e.g. BWP information 1) and the second BWP (e.g. BWP information 2), then the PRs associated with IDs that are less than or equal to 256 would be transmitted in the third BWP (e.g. BWP information 3) and the fourth BWP (e.g. BWP information 4). Such PR delivery information would be used by a UE to find the proper BWP to receive a paging message otherwise the UE would not know which BWP should be camped on to receive paging messages. In this way, the UE would consider the BWPs that may deliver the PR for the UE as the frequency band for listening to the paging messages, and the UE would need to listen to the BWPs which do not deliver any PR for the UE.

For example, if the ID of the UE is 250, then the UE should consider the third BWP and the fourth BWP as the frequency band for detecting the paging messages, and the UE does not need to listen to the first BWP and the second BWP for receiving paging messages. The third BWP and the fourth BWP might have considered as cell re-selection priorities, but for receiving paging messages, the UE does not need to listen to the first BWP and the second BWP which are not a part of the priority consideration.

For another example, the PR delivery rule could also include the PR delivery rule of a neighboring gNB or base station. In this way, even if the UE leaves the range of the serving gNB to the neighboring gNB, the UE would still be able to acquire information that are necessary for receiving paging messages in the neighboring gNB.

The PR delivery rule could be transmitted from a gNB to a UE in multiple ways. The PR delivery rule could be delivered by a dedicated signal or a broadcast signal. In one embodiment, the PR delivery rule could be broadcasted as a part of the system information (SI). If a UE just powers on, the UE would receive the SI and acquire the proper BWP to receive a paging message. The UE may continuously listen to the SI and update the PR delivery rule accordingly. Once UE receive the SI with the PR delivery rule, the UE would verify whether the current camped BWP would provide to the UE its PR. If the BWP would not, then the UE would camp on another BWP which may deliver its PR as the highest priority.

Figure 10:
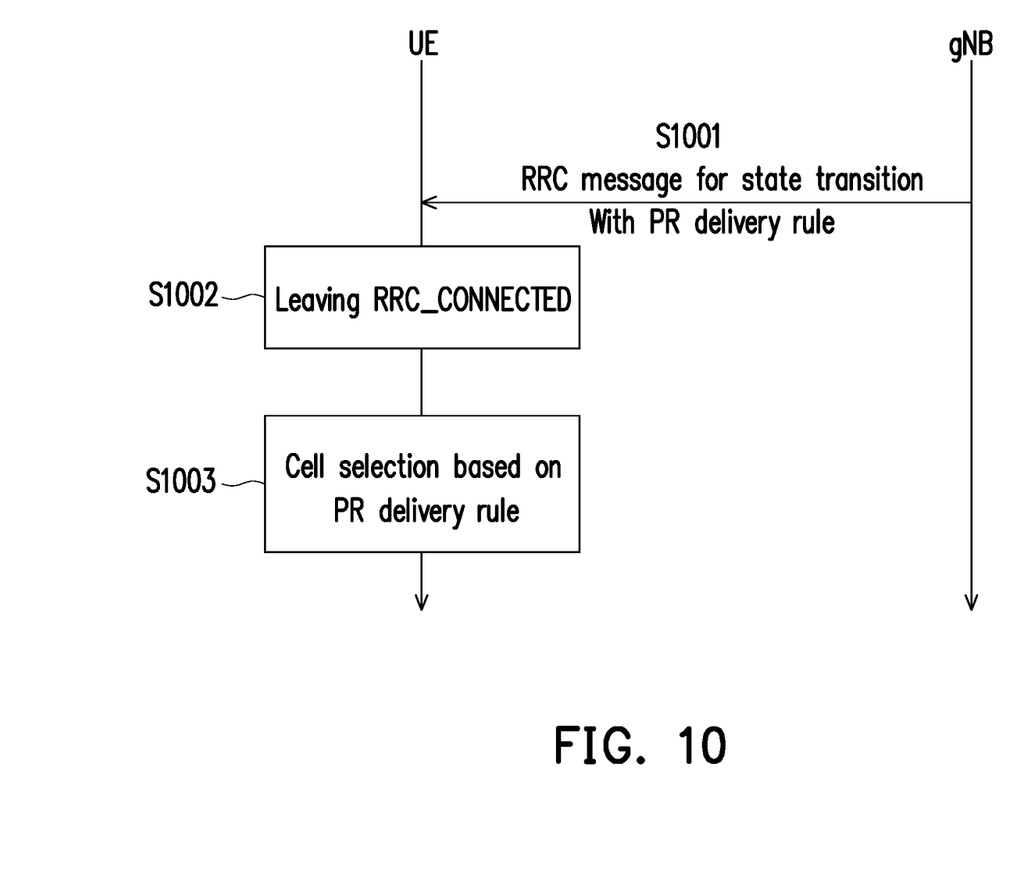
FIG. 10 is a signaling diagram which illustrates the transmission of PR delivery rule according to one of the exemplary embodiments of the disclosure.

A UE may also receive the PR delivery rule from a signaling message. FIG. 10 is a signaling diagram which illustrates the transmission of PR delivery rule according to one of the exemplary embodiments of the disclosure. In step S1001, the gNB would transmit a RRC message for state transition, and the RRC message would include a PR delivery rule. The RRC message could be a RRC connection release message. In step S1002, the UE would leave the RRC connected state and enter into a power saving mode. In step S1003, assuming that the UE would refer to the last acquired PR delivery rule to determine the proper BWP for receiving a paging message as its highest priority.

In view of the aforementioned descriptions, the disclosure is suitable for being used in a wireless communication system and is able to reduce power consumption of a communication system by transmitting different PRs within paging messages at different initial BWPs. Once a UE and a gNB know a PR delivery rule, the gNB is not required to transmit all the PRs to all the BWPs but instead would only be required to transmit a portion of the PRs to one or more specific BWPs.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero.

Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of receiving a paging message for a user equipment (UE), the method comprising:
    entering into a power saving mode;
    receiving a paging record (PR) delivery rule for assigning each of a plurality of UEs, comprising the UE, to a particular bandwidth part (BWP) for receiving paging records after entering into the power saving mode by monitoring a system information message;
    determining the BWP according to the PR delivery rule;
    re-selecting a cell which corresponds to the BWP which has been determined by the PR delivery rule; and
    receiving a paging message transmitted through the BWP by the cell; and
    entering a radio resource control (RRC) connected mode.

2. The method of claim 1, wherein the paging message comprising:
    a first plurality of paging records as each of the first plurality of paging records corresponds to a discontinuous reception (DRX) cycle and an identification (ID) of a UE, wherein the first plurality of paging records of the paging message has a different quantity from a second plurality of paging records of another paging message which is transmitted through another BWP.

3. The method of claim 1, wherein the PR delivery rule comprising a PR delivery information and a BWP information, and claim 1 further comprising: reading the PR delivery information from which the UE determines a frequency location of the BWP based on the BWP information; and
    selecting the frequency location of the BWP to receiving a paging message.

4. The method of claim 3, wherein the PR delivery rule further comprising:
    another PR delivery rule of a neighboring cell.

5. The method of claim 1, wherein the paging records are classified based on UE IDs, DRX cycles, or paging record categories.

6. The method of claim 5, wherein the paging record categories comprising: multiple levels of urgencies of the UE.

7. The method of claim 5, wherein the paging records are classified based on UE IDs comprising:
    associating a first portion of paging records which falls within a first range of UE IDs with a first BWP; and
    associating a second portion of paging records which falls within a second range of UE IDs with a second BWP.

8. The method of claim 1, wherein the PR delivery rule further comprises a BWP information, and further comprising:
    determining a frequency location of a BWP based on the BWP information by:
    a frequency information of the BWP associated with a cell defined synchronization signal block (CD-SSB);
    a frequency information of the paging message; or
    an assisting information of the frequency location of the BWP.

9. The method of claim 8, wherein the assisting information comprising:
    a frequency offset of the BWP corresponding to a BWP in which the UE camps on.

10. The method of claim 1, wherein receiving the PR delivery rule comprising:
    receiving the PR delivery rule from a radio resource control (RRC) release message which is received before the UE enters the power saving mode; or
    receiving the PR delivery rule from a broadcasted system information message.

11. A user equipment (UE) comprising:
    a wireless receiver; and
    a processor coupled to the wireless receiver and configured to:
        enter into a power saving mode;
        receive, via the wireless receiver, a paging record (PR) delivery rule for assigning each of a plurality of UEs, comprising the UE, to a particular bandwidth part (BWP) for receiving paging records after entering into the power saving mode by monitoring a system information message;
        determine a bandwidth part (BWP) according to the PR delivery rule;
        re-select a cell which corresponds to the BWP which has been determined by the PR delivery rule; and
        receive, via the wireless receiver, a paging message transmitted through the BWP by the cell; and
    entering a radio resource control (RRC) connected mode.

12. The UE of claim 11, wherein the paging message comprising:
    a first plurality of paging records as each of the first plurality of paging records corresponds to a discontinuous reception (DRX) cycle and an identification (ID) of a UE, wherein the first plurality of paging records of the paging message has a different quantity from a second plurality of paging records of another paging message which is transmitted through another BWP.

13. The UE of claim 11, wherein the PR delivery rule comprising a PR delivery information and a BWP information, the processor is further configured to read the PR delivery information so as to determine a frequency location of the BWP based on the BWP information, and selecting the frequency location of the BWP to receiving a paging message.

14. The UE of claim 13, wherein the PR delivery rule further comprising:
    another PR delivery rule of a neighboring cell.

15. The UE of claim 11, wherein the paging records are classified based on UE IDs, DRX cycles, or paging record categories.

16. The UE of claim 15, wherein the paging record categories comprising: multiple levels of urgencies of the UE.

17. The UE of claim 15, wherein the paging records are classified based on UE IDs comprising:
    associate a first portion of paging records which falls within a first range of UE IDs with a first BWP; and
    associate a second portion of paging records which falls within a second range of UE IDs with a second BWP.

18. The UE of claim 11, wherein the PR delivery rule further comprises a BWP information, and further comprising:
    determine a frequency location of a BWP based on the BWP information by:
    a frequency information of the BWP associated with a cell defined synchronization signal block (CD-SSB);
    a frequency information of the paging message; or an assisting information of the frequency location of the BWP.

19. The UE of claim 18, wherein the assisting information comprising:
a frequency offset of the BWP corresponding to a BWP in which the UE camps on.

20. The UE of claim 11, wherein the processor is configured to receive the PR delivery rule via the wireless receiver comprising:
receiving, via the wireless receiver, the PR delivery rule from a radio resource control (RRC) release message which is received before the UE enters the power saving mode; or
receiving, via the wireless receiver, the PR delivery rule from a broadcasted system information message.

* * * * *